United States Patent
Ealey et al.

[11] Patent Number: 5,094,519
[45] Date of Patent: Mar. 10, 1992

[54] COOLED LASER MIRROR HAVING ADAPTIVE FLOW CONTROL

[75] Inventors: Mark A. Ealey, Ayer; John A. Wellman, Lowell, both of Mass.

[73] Assignee: Litton System, Inc., Lexington, Mass.

[21] Appl. No.: 604,264

[22] Filed: Oct. 29, 1990

[51] Int. Cl.$^5$ .............................................. G02B 7/18
[52] U.S. Cl. .................. 359/845; 236/101 D; 359/846; 359/849
[58] Field of Search ............... 350/607, 609, 610, 611; 138/26, 45, 46; 236/101 D, 93 R

[56] References Cited

U.S. PATENT DOCUMENTS

| | | | |
|---|---|---|---|
| 3,909,118 | 9/1975 | Schmidt | 350/610 |
| 4,227,646 | 10/1980 | Hart et al. | 236/101 D |
| 4,655,563 | 4/1987 | Plante et al. | 350/611 |
| 4,844,603 | 7/1987 | Eitel et al. | 350/611 |

Primary Examiner—Bruce Y. Arnold
Assistant Examiner—J. P. Ryan
Attorney, Agent, or Firm—Michael H. Wallach; Robert F. Rotella

[57] ABSTRACT

A adaptive flow-control regulator is disclosed for use in controlling the circulation of cooling fluid through in a cooled laser mirror. The adaptive flow-control regulator utilizes a temperature-sensitive spring to control the movement of a plunger with respect to an orifice through which cooling fluid flows. Elongation of the spring is controlled by the temperature of the cooling fluid circulating around the spring. As the temperature of the coolant fluid increases from heating of the laser mirror, the spring contracts moving the plunger away from the orifice and allowing a greater volume of coolant to circulate through the mirror, thereby absorbing a greater amount of heat from the mirror structure. As the mirror is cooled by the circulating cooling fluid, the spring moves the plunger toward the orifice, thereby reducing the volume of cooling fluid circulating through the mirror's structure.

12 Claims, 1 Drawing Sheet

COOLED LASER MIRROR HAVING ADAPTIVE FLOW CONTROL

BACKGROUND OF THE INVENTION

1. Field of the Invention

This invention relates to cooled mirrors for use in laser systems and, in particular, to cooled mirrors in which a liquid is circulated through the mirror to remove excessive heat.

2. Summary of the Prior Art

High energy laser systems frequently require the use of mirrors to control the pointing direction of the laser beam. Usually the mirrors used in high energy laser systems are required to be cooled to prevent distortions from being introduced into the laser beam due to thermally induced distortion of the laser mirror's reflecting surface, and to prevent physical damage of the laser mirror from heat absorbed from the laser beam. Cooling traditionally is accomplished by circulating a coolant through a manifold in the supporting structure of the mirror and/or through the mirror's reflecting surface. See for example, U.S. Pat. Nos. 3,909,118; 4,443,059 and 4,770,521. As the power container in the laser beam increases, the amount of heat which must be removed from the mirror also increases, thereby requiring the movement of a greater mass of coolant at a higher velocity to achieve effective cooling of the mirror's reflecting surface. The high flow rates associated with such cooling introduces an undesirable effect in the mirror's reflecting surface known as coolant-flow induced jitter. This jitter component reduces the quality of the reflected laser beam at the image or focal plane and makes high resolution pointing and tracking of a high energy beam difficult to achieve. This problem is especially apparent in laser systems utilizing large diameter beams in which the surface which must be cooled requires complex manifolding and/or the movement of a conserval volume of coolant to effectively provide uniform thermal distribution across the entire face of the mirror. As the surface area of the mirror increases, differential thermal expansion may be experienced which produces bowing of the mirror structure due to localized heating across the surface. Traditionally, cooled mirrors have been fabricated from metals such as molybdenum or copper to take advantage of the high thermal conductivities of these metals. Unfortunately, mirrors manufactured from metal such as the foregoing are relatively heavy and bulky and are thus not suitable for use in space-based applications.

Lighter weight mirrors may be fabricated from materials having low coefficients of thermal expansion, such as zerodur type glass, silicon or silicon carbide. While use of materials such as the foregoing reduces the weight of the mirror structure, the detrimental effect of localized heating of a high energy laser beam, namely, beam degradation due to thermal distortion effects, are not eliminated. Thermal degradation still must be controlled by the use of coolant circulated through the mirror's structure, without the coolant inducing jitter from movement of the coolant through the structure. In addition, the coolant system should still be capable of selectively handling localized increases in the thermal load across the face of the mirror due to non-uniformity in the power density of the laser beam reflected from the mirror's surface. Ideally, the coolant system used for handling heatloading of the mirror should be selectively adaptable to provide only as much coolant as is required to handle the absorbed heat in localized portions of the mirror, without requiring excessive flow volume or pressure to minimize the effects of flow-induced jitter in the laser beam deflected from the mirror's reflecting surface. Using a conventional cooling approach, i.e. where coolant is uniformly passed through the entire mirror structure to handle the highest heatloading at any given area of the mirror, coolant flow rate must be achieved to control thermal distortions at the hottest spot on the mirror's surface. Systems which solve the heating problem utilizing the foregoing approach do not adequately address the problem of reducing flow induced jitter in the reflecting surface, nor are they entirely suitable for use in light weight structures where the material used to produce the mirror and its associated support structure may not have a high coefficient of thermal conductivity due to the need to produce the mirror and support structure from as low weight material as possible, particularly when the mirror is to be utilized in airborne or space-based applications.

SUMMARY OF THE INVENTION

A principle object of the invention is to provide a cooled laser mirror in which an adaptive flow control system is utilized to selectively control the flow of coolant through the mirror structure to avoid localized thermal discontinuities across the mirror's reflecting surface.

Another object of the invention is to provide a cooled laser mirror in which an adaptive flow control systems permits a reduced flow of coolant to be utilized to effectively provide uniform thermal gradients across the mirrorss reflecting surface.

Still another object of the invention is to provide an adaptive flow control system for a cooled laser mirror which permits the mirror and its support structure to be manufacture from light weight materials without requiring that such materials have a high coefficient of thermal conductivity.

Another object is to reduce the jitter produced in the reflecting surface of a cooled mirror by excessively high flow rates of coolant through the mirror and its supporting structure.

The above and other objects and advantages are achieved by using one or more adaptive flow control regulators to control the amount of coolant flowing through a mirror structure. The adaptive flow control regulators are located in the coolant flow stream and operate to selective control the amount of coolant passing between the coolant supply and the mirror in response to the temperature of the coolant passing through each regulator.

Each adaptive flow control regulator contain a plunger which may be selectively positioned to control the surface area of an orifice through which coolant flows. The plunger is mechanically fastened to a spring which changes size in response to the temperature of the coolant in which the spring is located. As coolant passing over the spring is heated from laser-induced thermal loads absorbed by the mirror's structure, the spring contracts, thereby moving the valve away from the orifice and permitting increased coolant flow through the adaptive flow control regulator. The additional coolant flow permits the coolant to absorb additional heat from the mirror's structure thereby removing unwanted heat from the reflecting surface and removing the possibility of thermally induced distortions.

Since the amount of coolant flowing through the structure is controlled to permit only the minimal amount of coolant flow required for any given heat load, the possibility of introducing jitter into the mirror's reflecting surface due to excessive coolant flow is minimized. While a conventional bimetallic spring could be used to control the position of the plunger relative to the orifice, a preferred embodiment of the adaptive flow control regulator disclosed herein uses a shape memory alloy for the spring to provide a substantial change in the position of the plunger relative to the orifice for a small change in the temperature of the coolant.

Another embodiment of the invention disclosed herein provides for the use of multiple adaptive flow control regulators to selectively control the flow of coolant through different areas of the mirror's structure thereby providing selective cooling of the mirror's structure. The foregoing arrangement permits coolant flow to be selectively regulated throughout the mirror's structure so that the volume of coolant flowing through any portion of the mirror is controlled to permit the minimum coolant flow required to cool any portion of the mirror's structure so that the mirror is cooled to a uniform temperature irrespective of whether one or more portions of the mirror are subject to excessive localized heat.

The use of an adaptive flow control regulator as disclosed herein provides an arrangement which permits varying the flow rate of coolant directed toward one or more areas of the mirrors reflecting surface without the need for external sensing systems, control electronics or power supplies to operate electrically-operated control valves. Consequently, the use of adaptive flow control regulators improves the reliability of the coolant system over competing systems requiring electronically operated valves and control and sensing circuits. Adaptive flow control regulators which utilize spring manufactured from shape memory alloys are thermally-driven phase change devices which operate without the requirement of electrical power. Since they are made from a nickel-titanium alloy corrosion is not a concern, thereby permitting the use of water or a water based coolant for cooling purposes.

BRIEF DESCRIPTION OF THE DRAWINGS

The above and other objects and advantages of the invention will be appreciated after view of the detailed description of a preferred embodiment when read in conjuction with the drawings in which.

DETAILED DESCRIPTION OF PREFERRED EMBODIMENT

Figure 1:
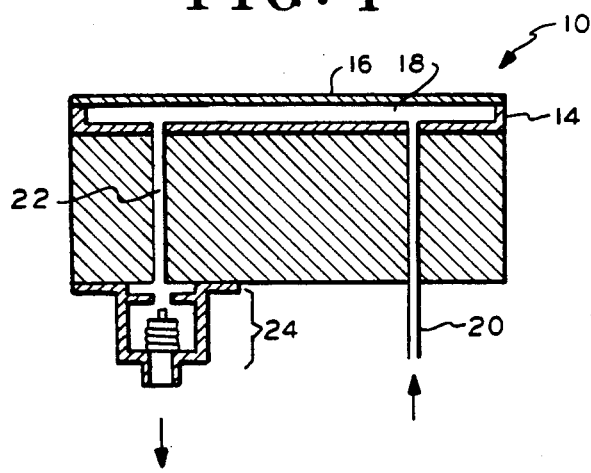
FIG. 1 is a perspective view of a cross section of a laser mirror having an adaptive flow control system for controlling the flow of coolant.

Referring to the drawing, FIG. 1 shows a first preferred embodiment of a cooled laser mirror having an adaptive flow control system constructed in accordance with the teachings of the invention. The mirror 10 includes a support base 12 which supports a facesheet 14 having reflective surface 16 on one side thereof. The facesheet includes an elongated chamber 18 through which a fluid may be circulated to remove heat absorbed by the facesheet from an impinging laser beam. A coolant is circulated into the chamber 18 through inlet port 20 and exits the mirror through line 22 which passes through the mirror's base 12. An adaptive flow control regulator shown generally at 24 is used to control the volume of fluid passing through the chamber 18. The regulator 24 is connected to the outlet line 22, and is shown in grater detail in FIG. 2.

Figure 2:
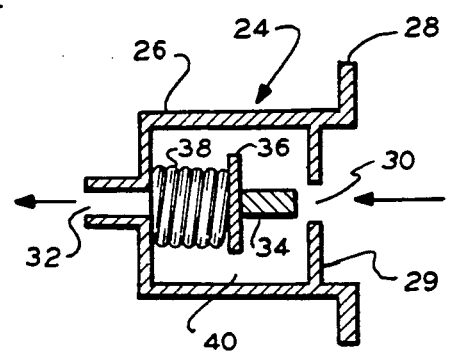
FIG. 2 is a sectional view of an adaptive flow control regulator.

FIG. 2 shows that the adaptive flow control regulator 24 includes a body 26 having a mounting flange 28. An orifice 30 is formed in wall 29 of the body 26. Outlet port 32 is adapted to receive a hose or other fluid-conveying means to permit cooling fluid to be removed from the mirror 10. A plunger 34 is fitted through a base 36 to a spring 38. The preferred embodiment disclosed herein shows a coil spring, however, it is to be understood that any shape of spring which performs the function of biasing the plunger 34 toward and away from the orifice 30 in reponse to a change in the temperature of the spring may be used to effect the object of the invention.

While the spring 38 can be manufactured from a conventional bimetallic material, so that it responds by changing length in response to a change in coolant temperature, the preferred embodiment disclosed herein uses a spring 38 manufactured from a shape memory alloy which exhibits a rapid change in length in response to small variations in the change in the temperature of the coiled wire comprising the body of the spring. A coiled spring configuration was chosen for the spring 38 because of the greater mechanical advantage available from the use of a coil spring due to the length of the material which can be placed in a coil configuration. Spring 38 is retained in a chamber 40 through which fluid used to cool the mirror's reflecting surface 16 flows on its way out of the mirror structure. The temperature of the fluid influences the amount of elongation exhibited by spring 38, thereby moving the plunger 34 toward or away from the orifice 30.

Spring 38 may be manufactured from a shape memory alloy which may be obtained for example, from Shape Memory Application, Inc. of Sunnyvale, CA. As used herein, the term "shape of memory alloy" refers to a material which retains a plastic deformation strain below a critical temperature and, when heated above that temperature, converts the heat energy into mechanical work, thereby returning to an earlier shape. The shape memory effect exhibited by shape memory alloys arises from a change in crystal structure caused by a varying temperature or stress in the alloy; the foregoing being referred to as thermo-elastic martensitic transition. A metallic crystal structure with an austenitic micro-structure undergoes a phase change when rapidly cooled and forms a twinned martensitic structure. When the material is deformed while in its twinned martensitic phase, the crystal structure becomes a martensitic structure with build in thermo-elastic stress. When heated, the material rapidly transforms into the austenitic phase; and when cooled, returns to its stable twinned martensitic condition. Detailed information on shape memory alloys may be found by references to the following publications, the teachings of which are incorporated herein by reference: "Shape Memory Alloys", L. M. Schetkg, *Scientific American*, November, 1979, p. 68.; C. M. Jackson, H. L. Wagner and R. J.

Figure 3:
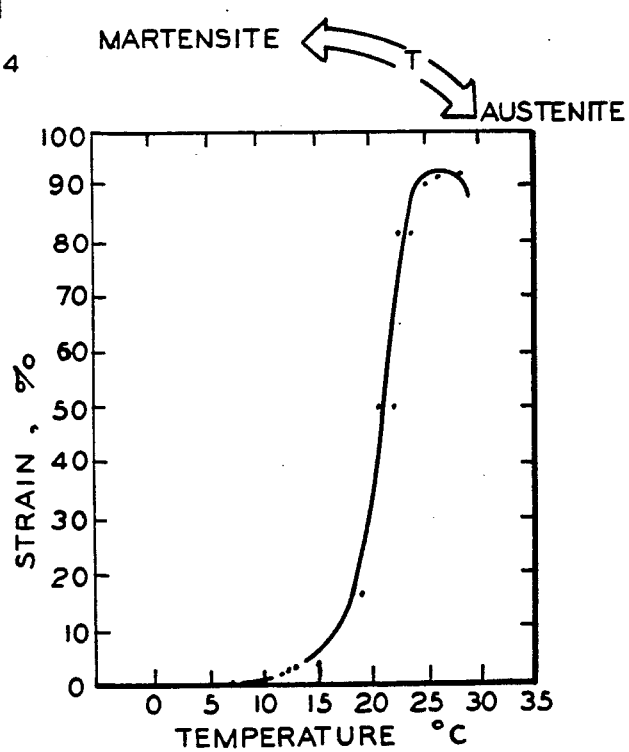
FIG. 3 is a graph of the typical strain temperature transfer function for a nickel-titanium shape memory alloy.

Wasilewski, "55—NITINOL—The Alloy with a Memory", NASA publication no. 5P-5110, National Aeronautics and Space Administration (1972); K. Shinruzik and T. Tadaki, "Shape Memory Alloys", edited by H. Funakubo, Gordon and Breach Science Publisher (1987). FIG. 3 shows a graph of the sensitivity of a typical shape memory alloy, specifically, an alloy of nickel-titanium, to temperature variation. In particular, it will be noted from FIG. 3 that a small change in temperature produces a significant change in the strain of the material in a relatively short period of time, which can be as short as a few milliseconds for a temperature differential of as low as two degrees centigrade.

In order to produce a shape memory alloy spring which undergoes a reproducible two-way process, i.e. elongation and contraction, the alloy must be trained. The alloy from which the spring is manufactured is chosen to undergo phase transformation at the desired fluid temperature at which increased fluid flow is required. The alloy is then deformed into the required spring configuration i.e., in the case of the preferred embodiment disclosed herein, a coil shape, and is secured in a fixture to retain the desired shape. The alloy is then heat treated to produce a "memory". Thereafter, the spring is removed from the fixture and is strained to an intermediate shape. Upon application of heat to the spring past the transition temperature, the material will restore its shape to the initial shape. When cooled, it will retain the intermediate form.

The adaptive flow control regulator 24 serves a dual function by sensing the change in cooling temperature flowing through the regulator 24 and providing a means to implement real time flow regulation via movement of the plunger 34 toward and away from the orifice 30. The spring 38 is bonded to the base 26 using a high temperature curing adhesive. When a thermal load is applied to the mirror, the coolant heats up and the shape-memory alloy spring 38 responds by moving the plunger 34 away from orifice 30 to permit a greater volume of coolant to flow through orifice 30. The increased fluid flow promotes cooling of surface 16 by absorbing heat through the passage of the fluid through chamber 18 in the mirror's facesheet 14. When the induced heating load caused by the laser beam has been reduced, plunger 34 moves toward orifice 30 thereby reducing the quantity of coolant flowing through the mirror's structure. Plunger 34 is positioned relative to orifice 30 so that a trickle flow of coolant always passes through the regulator 24 to permit spring 38 to sense the temperature on the surface of the facesheet 14.

Figure 4:
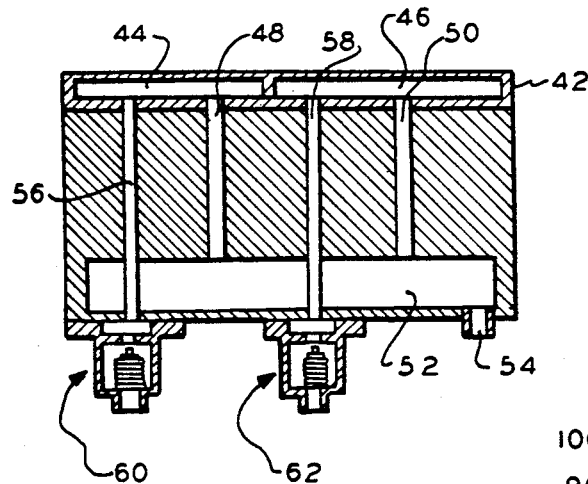
FIG. 4 is a perspective view in section of a second embodiment of a cooled laser mirror utilizing the teachings of the invention to control the flow of coolant.

FIG. 4 shows a second embodiment of a laser mirror to which the teachings of the invention may be applied. In particular, facesheet 42 has been divided in two chambers 44 and 46 to receive coolant for removing heat generated in facesheet 42 by energy absorbed from a laser beam reflected off the surface of the facesheet. Chamber 44 and chamber 46 are connected via ducts 48 and 50 respectively to a coolant supply chamber 52 which may be supplied from an external source (not shown) via inlet 54. Fluid that circulates through chambers 44 and 46 are drained from the chambers respectively through lines 56 and 58 through adaptive flow control regulators 60 and 62.

During operation of a laser mirror such as that shown in FIG. 4, it is possible that non-uniform heating of the facesheet 42 will occur, for example, due to a high energy laser beam dwelling on one portion of the mirror's reflecting surface longer than on another portion or randomly roving across the reflecting surface. In such instances, non-uniform heating of the facesheet will occur with the result that coolant circulated through chambers 44 and 46 will be non-uniformly heated. As coolant circulates through chambers 44 and 46, the adaptive flow control regulators 60 and 62 will be heated by differing amounts due to the differential in temperature between the fluid passing through regulator 60 and through regulator 62. The differential heating of the regulators 60 and 62 will cause differing amounts of fluid to be transferred from the coolant supply in chamber 52 through chambers 44 and 46, with the chamber containing the higher temperature coolant being subject to a higher flow rate due to the operation of the regulators 60 and 62. Thus, the regulators 60 and 62 operate to remove excessive localized heating in the facesheet 42 by selectively controlling the amount of coolant passing through each of the chambers 44 and 46. While a two chamber facesheet has been shown herein, it will be appreciated by one skilled in the art that in practice a facesheet having many chambers could be constructed with each individual chamber, or groups of chambers, individually connected to adaptive flow control regulators to selectively control the movement of cooling fluid through each individual or each group of cooling chambers in the facesheet.

The use of one or more adaptive coolant flow control regulators in connection with a cooled laser mirror permits coolant flow to be directed toward that portion of the mirror's reflecting surface under thermal load, while a trickle flow of coolant is provided to those other locations of the mirror not under load. The trickle flow of coolant acts as a thermal sensing arrangement to permit the adaptive flow control regulators to receive information on thermal build-up across the surface of the mirror, and to selectively adjust the amount of coolant directed toward the reflecting surface to achieve uniform temperature distribution.

Many modifications and variations to the disclosed invention may be made without departing from its spirit and scope, and such changes will become apparent to those skilled in the art. The specific embodiments described herein are offered by way of example only and the disclosed invention is intended to be limited only by the permissible scope of interpretation of the appended claims.

We claim:

1. A cooled mirror for redirecting the pointing direction of a high-energy laser beam, said cooled mirror being comprised of:
   a. a body having coolant-carrying passages contained therein;
   b. a faceplate having a front reflecting surface and at least one enclosed chamber for receiving cooling fluid, said faceplate being fastened to said body and having fluid inlet and fluid outlet ports positioned to permit cooling fluid to be transferred between the coolant-carrying passages in said body and the enclosed chamber in said faceplate;
   c. means connected to the coolant-carrying passages in said body for circulating a cooling fluid toward and away from said faceplate; and
   d. an adaptive flow control regulator positioned between said means for circulating cooling fluid and the body of said cooled mirror for regulating the quantity of cooling fluid flowing through the enclosed chamber in said faceplate in response to changes in the temperature of the cooling fluid.

2. The cooled mirror of claim 1 wherein said adaptive flow control regulator is attached to the body of said cooled mirror.

3. The cooled mirror of claim 1 wherein said faceplate has two or more enclosed chambers for receiving cooling fluid, each of said chambers being connected to a separate adaptive flow control regulator for individually controlling the quantity of cooling fluid circulating through each of said enclosed chambers.

4. The cooled mirror of claim 3 wherein each adaptive flow control regulator permits the flow of some cooling fluid at all times.

5. The cooled mirror of claim 1 wherein said adaptive flow control regulator is comprised of a temperature sensitive spring and a plunger positioned in close proximity to an orifice through which coolant fluid may flow, said spring controlling the position of the plunger relative to the orifice to control the quantity of coolant fluid passing through the orifice.

6. The cooled mirror of claim 5 wherein the temperature sensitive spring is comprised of a shape memory alloy.

7. The cooled mirror of claim 6 wherein the temperature sensitive spring is a coil spring.

8. A cooled laser mirror having a reflecting surface for redirecting a laser beam impinging thereon, said cooled laser mirror being comprised of:
   a. a faceplate having a reflecting surface on one side thereof, said faceplate including a plurality of chambers for receiving cooling fluid, each chamber having an inlet port and an outlet port;
   b. a base for supporting said faceplate;
   c. a manifold for distributing cooling fluid to each of said chambers through the inlet port of each chamber;
   d. a plurality of coolant-conducting lines passing through said base, each of said coolant-conducting lines being connected to an outlet port of each chamber to conduct cooling fluid away from the chambers in said faceplate; and
   e. an adaptive flow control regulator connected to each of said coolant-conducting lines, each of said adaptive flow control regulators controlling the quantity of cooling fluid flowing from each of said chambers in response to the temperature of the cooling fluid flowing out of each of said chambers in said faceplate.

9. The cooled laser mirror of claim 8 wherein the manifold for distributing cooling fluid is located within said base.

10. The cooled laser mirror of claim 9 wherein at least some cooling fluid always flows through each adaptive flow control regulator.

11. The cooled laser mirror of claim 10 wherein the quantity of cooling fluid flowing through each adaptive flow control regulator is controlled by a spring manufactured from a shape memory alloy.

12. The cooled laser mirror of claim 11 wherein the cooling fluid passes through an orifice in each of said adaptive flow control regulators and the quantity of cooling fluid passing through each of said adaptive flow control regulators is controlled by the linear movement of a plunger toward and away from each of said orifices.

* * * * *